Nov. 21, 1950 — W. J. O'BRIEN — 2,530,903
NAVIGATION SYSTEM
Filed July 28, 1949 — 5 Sheets-Sheet 1

INVENTOR.
WILLIAM J. O'BRIEN
BY Walter P. Huntley
Attorney

Nov. 21, 1950 — W. J. O'BRIEN — 2,530,903
NAVIGATION SYSTEM
Filed July 28, 1949 — 5 Sheets-Sheet 2
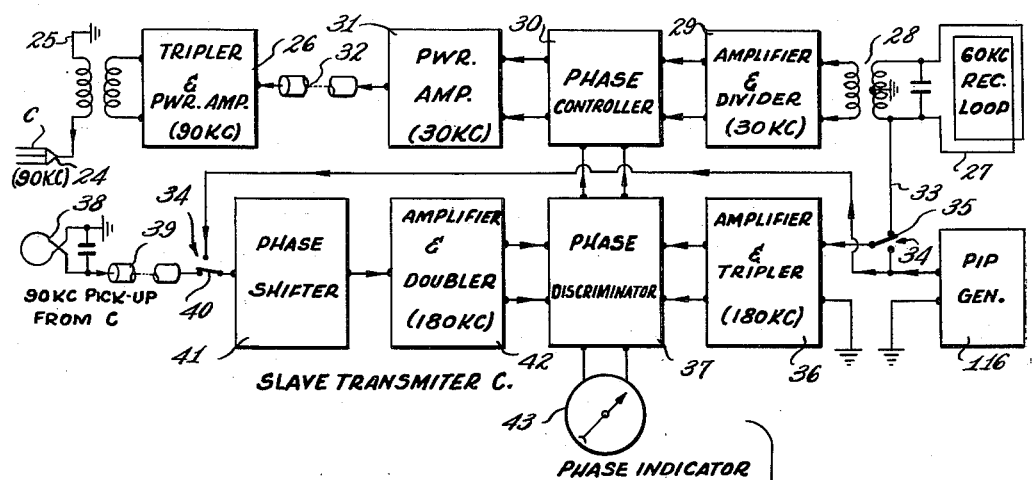
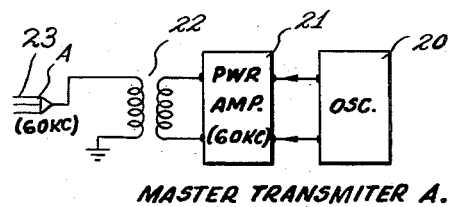
*Fig.3*
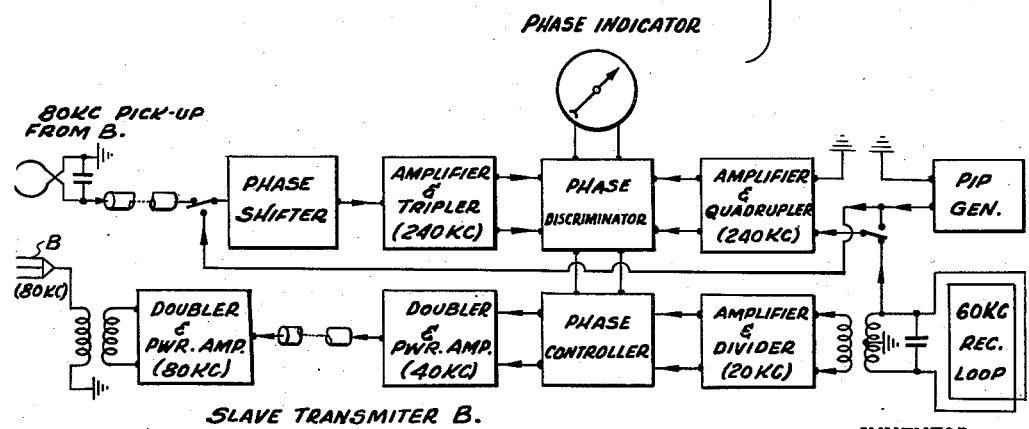
INVENTOR.
WILLIAM J. O'BRIEN
BY Walter P. Huntley
Attorney Nov. 21, 1950  W. J. O'BRIEN  2,530,903
NAVIGATION SYSTEM
Filed July 28, 1949  5 Sheets-Sheet 3

INVENTOR.
WILLIAM J. O'BRIEN
BY
Walter P. Huntley
Attorney

Nov. 21, 1950     W. J. O'BRIEN     2,530,903
NAVIGATION SYSTEM
Filed July 28, 1949     5 Sheets-Sheet 4
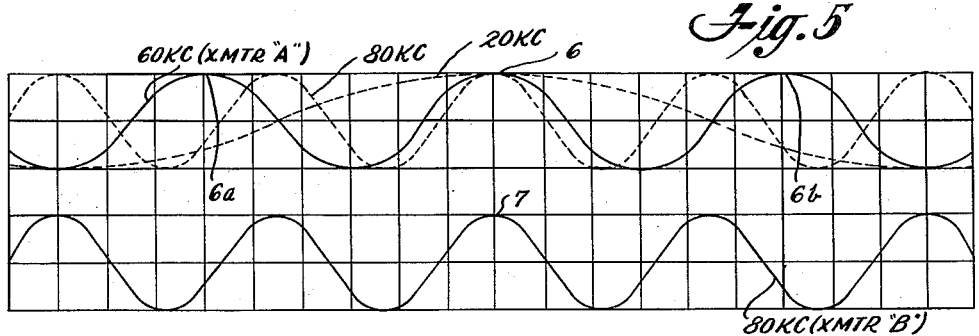
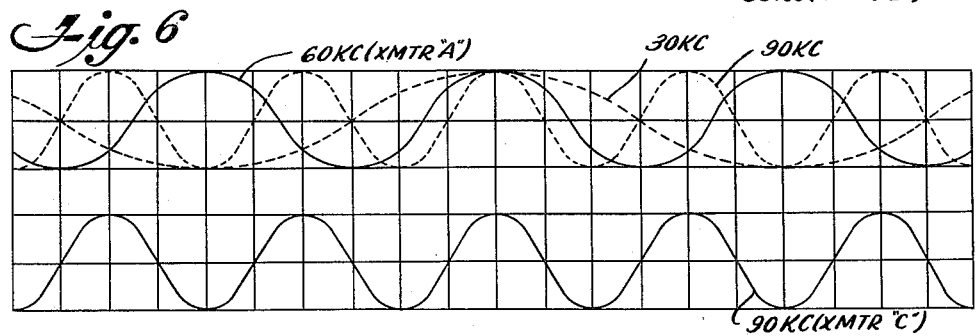
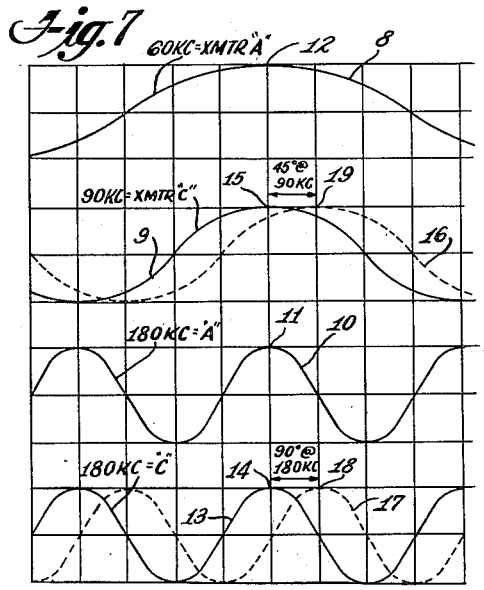
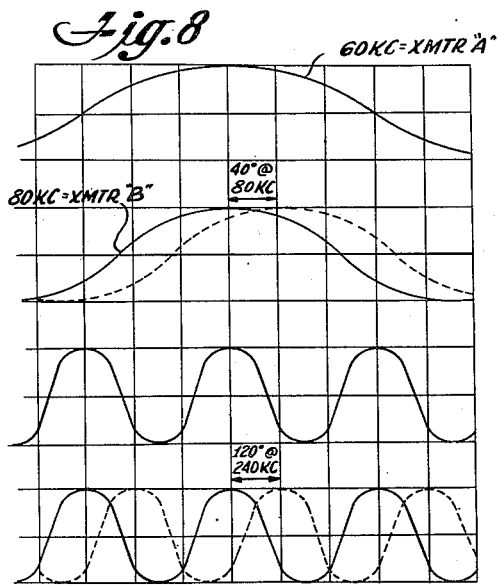
INVENTOR.
WILLIAM J. O'BRIEN
BY
*Attorney*

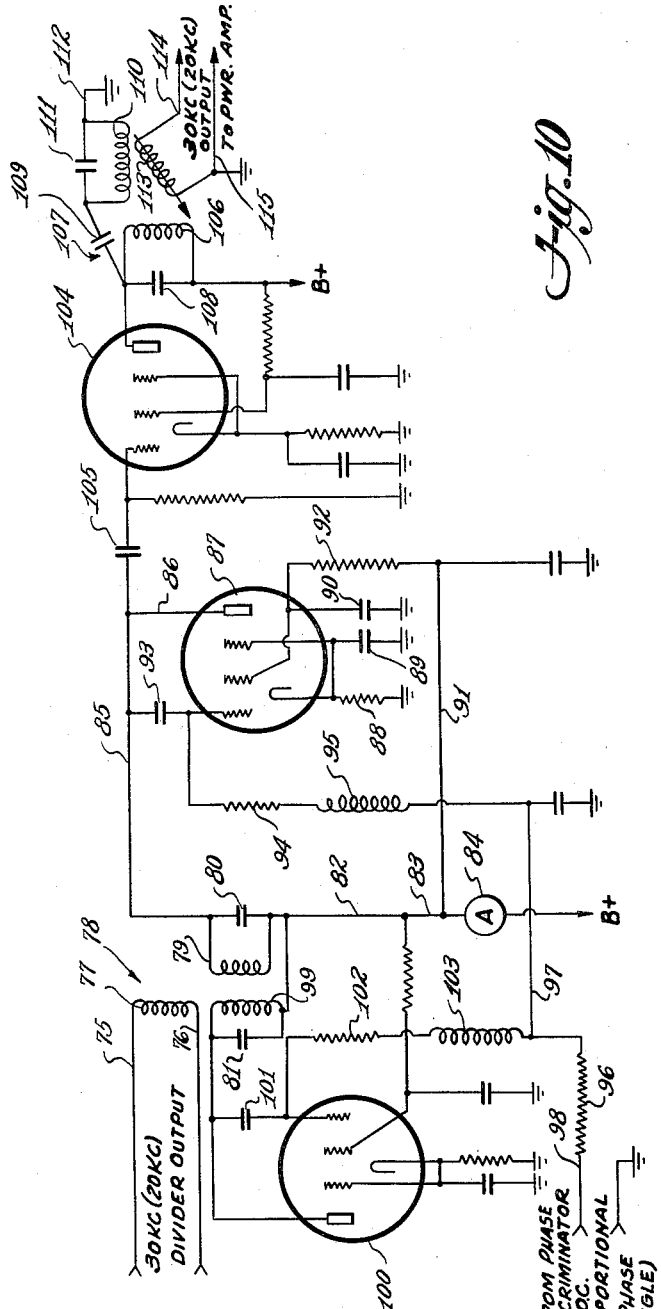

Patented Nov. 21, 1950

2,530,903

UNITED STATES PATENT OFFICE 2,530,903

NAVIGATION SYSTEM

William J. O'Brien, London, England

Application July 28, 1949, Serial No. 107,337
In Great Britain August 23, 1945

23 Claims. (Cl. 343—105)

My invention relates to a navigation system and has particular reference to a radio frequency transmitting and receiving system for indicating continuously the geographical location of mobile receivers.

This application is a continuation-in-part of my copending applications, Serial No. 612,985, filed August 27, 1945, entitled Radio Frequency Transmission Apparatus, and Serial No. 612,987, filed August 27, 1945, entitled Navigation System, both of which are now abandoned.

It has long been the practice to employ radio transmitting apparatus for controlling the navigation of certain types of vehicles, such as ships and aircraft, along prescribed courses by indicating with radio receiving apparatus any departures of the vehicle from the pre-established course. Such a navigation system does not indicate the geographical location of the vehicle but merely places the vehicle's location as being to one side or the other of a predetermined course line.

In certain navigational problems as, for example, in the guiding of surface ships and aircraft in war time, it is highly desirable to provide a reliable and precisely continuous indication of the geographical location of a vehicle without requiring reference to landmarks and without requiring resort to the cumbersome, time consuming and unreliable process of dead-reckoning.

The present invention is directed to a radio frequency transmission system which will operate to continuously indicate the geographical location of a mobile receiver designed to be used with the system. Such a receiver may be mounted on motor vehicles, surface ships and aircraft.

It is an object of my invention to provide a navigation system of the character referred to in the preceding paragraph which is so arranged as to make it substantially impossible for the system to be rendered inoperative as a result of conflicting transmissions as, for example, by enemy attempts to "jam" the system.

It is an additional object of my invention to provide a system of the character set forth in the preceding paragraph in which the geographical location of the mobile receiver is indicated in terms of a coordinate system represented by lines of equal phase displacement between two sets of simultaneous transmissions.

It is a still further object of my invention to provide a system of the character referred to in the preceding paragraphs in which the equi-phase field patterns defining the coordinate system are established by means of continuous transmissions from spaced points at different by related frequencies.

It is also an object of my invention to provide a navigation system of the character referred to hereinbefore in which each of the mobile receivers is provided with an indicating device for indicating continuously and with precision the values of the two coordinates defining the instantaneous geographical location of the receiver.

The navigation system described herein operates to establish superimposed and intersecting lines of equal phase displacement, thus defining a coordinate system which may be used for guiding the navigation of vehicles of various types. In my copending application Serial No. 612,991, filed August 27, 1945, now Patent No. 2,500,200 issued March 14, 1950, and entitled Multiple Channel Radio Frequency Receiver, I have disclosed a radio frequency receiving apparatus which is particularly adapted for the reception of such synchronized transmissions and for indicating the coordinate location of a vehicle equipped with such an apparatus.

In order for a navigation system of this character to be reliable in its operation, it is necessary that the phase relationships between the various transmissions be closely and continually regulated, preferably by automatic means. Such a regulating system must maintain a very precise control over the phase relationships and must have a control range sufficient to compensate for the effects of atmospherics, temperature, humidity and weather upon the transmission equipment and tending to alter or disturb the desired phase relation.

The phase control apparatus must also be so arranged as to permit continuous checks to be made upon the operation of the controller to provide for immediate detection of any faulty operation and to permit the making of such adjustments as may be required to restore the normal operating condition.

It is therefore another object of my invention to provide a radio frequency transmitting apparatus for producing a plurality of synchronized radio frequency transmissions from spaced antennae and at unlike but related frequencies, and which includes a means for continually regulating the phase relationships between the plurality of transmissions.

It is also an object of my invention to provide an apparatus of the character set forth in the preceding paragraph in which the phase controlling mechanism is entirely automatic in its operation.

It is a still further object of my invention to provide in an apparatus of the character set forth in the preceding paragraphs a phase relation indicator, permitting continuous monitoring of the phase relation of the transmissions.

It is additionally an object of my invention to provide in an apparatus of the character set forth in the preceding paragraphs a phase displacement standard which may be inserted into the system at any time to check the operation of the phase monitoring equipment.

It is an additional object of my invention to provide an apparatus of the character set forth in the preceding paragraphs in which one of the radio frequency transmitters is operated as a "master" station with the remainder of the transmitters being operated as "slave" stations rebroadcasting at an unlike but related frequency signals received from the master station.

Other objects and advantages of my invention will be apparent from a study of the following specifications, read in connection with the accompanying drawings, wherein:

Fig. 3 is a schematic or block diagram illustrating the construction and operation of the transmitting apparatus;

Fig. 5 is a graph explaining the manner in which a fixed multiple phase relationship may be considered to exist between two unlike but related frequencies;

Fig. 6 is a graph similar to Fig. 5 but illustrating the phase relationships between signals of different frequency than those represented in Fig. 5;

Fig. 7 is a graph illustrating the effect of a shift in relative phase between two signals of unlike but related frequencies;

Fig. 8 is a graph similar to Fig. 7 but illustrating the effect when the frequencies are different than those illustrated in Fig. 7;

Fig. 10 is a wiring diagram illustrating in detail the components and electrical connections employed in the phase controller portion of the apparatus.

Figure 1:
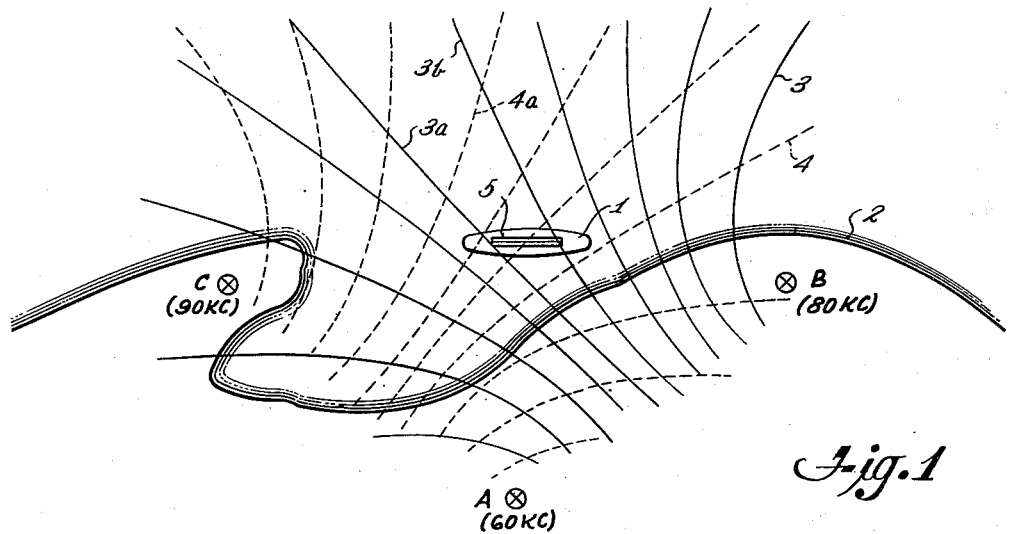
Fig. 1 is a schematic drawing representing one form of the navigation system of my invention and indicating one way in which the equi-phase radio frequency field patterns may be developed to provide a coordinate system for indicating the geographical location of a vehicle.

Referring to the drawings, Fig. 1 is a diagrammatic view illustrating the mode of operation of the navigation system of my invention. As is shown therein, the system includes three radio frequency transmitters identified, respectively, by the letters A, B and C. In the event the apparatus is to be used for guiding the navigation of sea-going vessels such as is represented by the outline 1 in Fig. 1, the transmitters A, B and C may be placed at or near the shoreline 2, and are spaced from each other at predetermined distances and are synchronously operated at unlike but related frequencies as, for example, 60, 80 and 90 kilocycles, respectively. Furthermore, the phase relationships among the three transmissions are held fixed.

In Fig. 1 and in subsequent figures of the drawings, it will be noted that operational frequencies have been assigned to various portions of the apparatus. These frequencies are given by way of example only, it being understood that other frequencies may be used, if desired. Hereinafter when reference is made to a specific operating frequency, it will be understood that this is with reference to the illustrated example and that, if desired, other frequencies may be used and that corresponding changes will be required with reference to other parts of the apparatus.

As is shown in Fig. 1 and as will be explained in detail hereinafter, the radio frequency transmissions from the antennae A and B interact to establish a field pattern such as that represented by the solid lines 3 in Fig. 1, each of which lines represents the locus of equal phase displacement between the signals emanating from the transmitters A and B and referred to a frequency which is the least common multiple of the frequencies at which the transmitters are operated. In the assumed example of 60 and 80 kilocycles for the transmissions from A and B, the reference frequency is 240 kilocycles. In a similar manner, the interaction of the fields produced by the transmitters A and C will be represented by dotted lines 4 of equal phase displacement as referred to a frequency equal to the least common multiple of the two transmitted frequencies; in the example assumed, 180 kilocycles.

By positioning the antennae A, B and C somewhat as illustrated in Fig. 1; that is, with the line joining antennae A and B at an angle to the line joining antennae A and C, the two field patterns may be made to overlap in such a way that the equi-phase lines 3 of the A-B pattern, for example, may be made to extend across the equi-phase lines 4 of the A-C field.

Since the field patterns represented by the lines 3 and 4 may be computed and plotted with great precision, it is obvious that the geographical location of the vessel 1 will be precisely indicated in terms of the coordinate system represented by the equi-phase lines 3 and 4.

In Fig. 1 it may be assumed that each of the individual lines 3 represents surfaces of zero phase displacement so that in proceeding along one of the lines 4 (as, for example, the line 4a) from one of the lines 3 (for example, the line 3a) to an adjacent line 3 (as, for example, the line 3b), the phase relation between the A and B signals will undergo a progressive change of 360 electrical degrees. It will be understood that the space between the adjacent lines shown on Fig. 1 may be subdivided into as small subdivisions as may be desired. In the practice of my invention, I prefer to divide a full electrical circle into one hundred parts to facilitate the numbering of the coordinate system and to permit coordinate locations to be expressed as whole numbers and decimal parts thereof. To facilitate reference to the various coordinates, the coordinate location measured by means of the coordinate lines 3 with respect to the A-B transmissions will be referred to as the "X" coordinate, whereas that defined by the coordinate lines 4 will be referred to as the "Y" coordinate.

The vessel 1 is equipped with a receiving antenna 5 which is connected to a radio reception apparatus of the character disclosed in my copending application Serial No. 612,991, and briefly described hereinafter with reference to Fig. 4. This receiver serves to provide an indication of the phase relationship between the A and B transmissions and the phase relationship between the A and C transmissions to thereby provide an indication of the geographical location of the vessel 1 in terms of the coordinate system represented by the equal phase displacement lines 3 and 4. As is explained more fully hereinafter, the receiving apparatus also includes a totalizing mechanism for indicating cumulative total of such phase changes as may result from motion of the vehicle so that by setting the indicators initially at a coordinate indication coincident with the then geographical location of the vessel, a continuous indication will thereafter be given of the geographical location of the vessel as it moves from place to place throughout the fields generated by the three transmitters.

Figure 2:
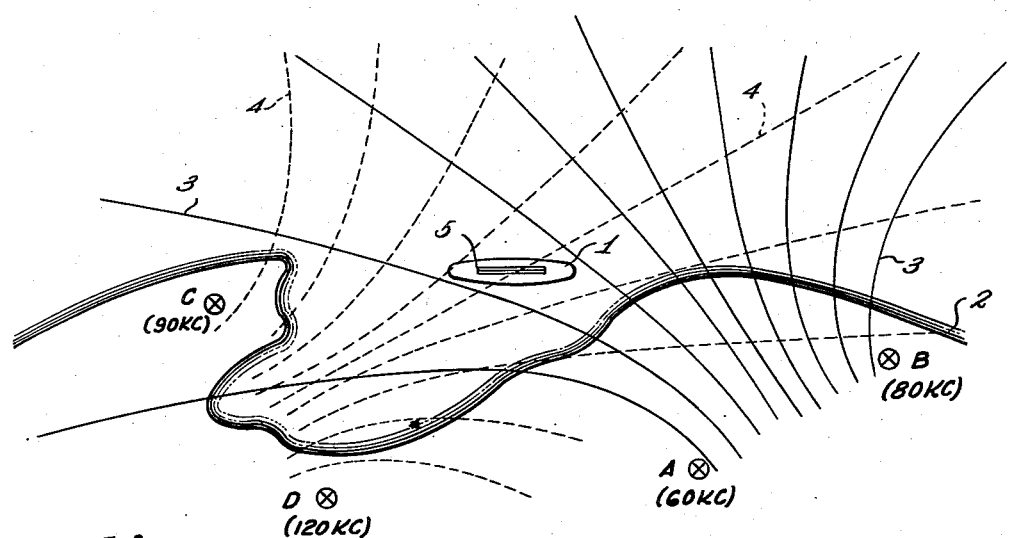
Fig. 2 is a schematic view similar to Fig. 1 but illustrating a modified arrangement of the transmitting apparatus.

In Fig. 2, I have illustrated a modification of the system which is shown in Fig. 1 and which differs therefrom in that two transmitters A—B are employed for producing equi-phase lines 3 defining the "X" coordinate, whereas two other transmitters C and D are employed for producing equi-phase lines 4 defining the "Y" coordinate. The receiving apparatus carried by the vessel 1 includes means for simultaneously receiving all four signals and indicating the phase relationships in the manner described in connection with Fig. 1.

In order to facilitate understanding the operation of the system, reference should be had to Figs. 5 and 6 which constitute graphs illustrating the manner in which a fixed multiple phase relationship may be considered to exist between transmissions of different but related frequencies as, for example, 60 kilocycles and 80 kilocycles, on the one hand, and 60 kilocycles and 90 kilocycles on the other. In Figs. 5 and 6 signal amplitude has been plotted as ordinates and time or electrical degrees have been plotted as abscissa, it being recognized that the relation between the absolute phase angle and time may be represented by $$\theta = wt$$

where $w$ is 6.2832 times the frequency.

In the upper portion of Fig. 5, the solid line is representative of a 60 kilocycle transmission such as that radiated from antenna A. By means of a frequency divider circuit such as that described in my copending application Serial No. 612,990, filed August 27, 1945, now Patent No. 2,483,556, issued October 4, 1949, and entitled Frequency Divider Circuits, the 60 kilocycle frequency may be divided down to a 20 kilocycle frequency such as represented by the dashed line in the upper portion of Fig. 5. For convenience in indicating the phase relationships, the positive maxima of the 60 kilocycle wave and the 20 kilocycle wave have been selected as coinciding at the point 6. Through the use of frequency multiplying circuits, the 20 kilocycle wave may be converted to an 80 kilocycle transmission such as that represented by the dotted line in the upper portion of Fig. 5. Here again, the positive maxima have been taken as coinciding at the point 6.

In the lower part of Fig. 5 there is indicated an 80 kilocycle transmission. If the positive maximum indicated by the reference character 7 coincides with the positive maximum 6 of the 60 kilocycle transmission, then it will be seen by inspection that the 80 kilocycle wave represented by the solid curve in the lower portion of Fig. 5 is precisely in phase with the 80 kilocycle wave represented by the dotted line in the upper portion of Fig. 5. It may, therefore, be said that a fixed multiple phase relationship actually exists between the 60 kilocycle and 80 kilocycle transmissions.

In Fig. 6 the same analysis is made with respect to the phase relation between a 60 kilocycle transmission and a 90 kilocycle transmission. In this latter instance the 60 kilocycle is divided down to 30 kilocycles represented by the dashed line curve and then trebled to 90 kilocycles as shown by the dotted line curve.

Figs. 7 and 8 serve to explain how a shift in absolute phase of one transmission (the absolute phase of the other transmission being held fixed) may be detected as a change in the relative phase relation between the two signals as measured in terms of a reference frequency equal to the least common multiple of the frequencies of the two transmissions.

Figs. 7 and 8 are graphs representing signal amplitudes as ordinates and times or absolute phase angle as abscissa. In the upper portion of Fig. 7, there is represented by the curve 8 a portion of a 60 kilocycle wave. Similarly, the solid line curve 9 represents a portion of a 90 kilocycle wave. The reference frequency for measuring the phase relation between these two signals will be 180 kilocycles or the least common multiple of the frequencies 60 kilocycles and 90 kilocycles. The solid line curve 10 in Fig. 7 represents a 180 kilocycle wave resulting from trebling the 60 kilocycle frequency represented by the curve 8. For the purpose of simplifying the explanation, it has been assumed that the frequency multiplying circuits are so adjusted as to cause the positive maximum 11 of the curve 10 to coincide in time with the positive maximum 12 of the curve 8. The solid line curve 13 of Fig. 7 represents a 180 kilocycle frequency obtained by doubling the 90 kilocycle frequency represented by the curve 9. Here again, the apparatus is assumed to be adjusted to cause the positive maximum 14 of the curve 13 to coincide in time with the positive maximum 15 of the curve 9.

Now assume that due to a change in the geographical location of the vessel 1, the absolute phase of the 90 kilocycle signal is shifted 45° as is represented by the dotted line 16 in Fig. 7, the distance of the vessel 1 from the antenna A being held constant so that no phase shift occurs in the 60 kilocycle signal. When the 90 kilocycle wave 16 is doubled to 180 kilocycles, the result is as represented by the dotted curve 17 in Fig. 5, the positive maximum 18 of the curve 17 coinciding in time with the positive maximum 19 of the curve 16.

It will be noted by inspection that the curve 17 is displaced 90 electrical degrees from the curve 13. Since under the assumed initial conditions the curves 13 and 10 were in phase with each other, shifting the phase of the curve 9 45° has resulted in a shift of the curve 17 90° with respect to the curve 10 derived from the 60 kilocycle transmission radiated from the antenna A. Thus, by making the phase comparison on the basis of a reference frequency equal to the least common multiple of the two transmission frequencies, a shift in phase of one of the transmissions with respect to the other may be detected and therefore measured.

It will be noted that the phase shift at 180 kilocycles is double that at 90 kilocycles. In a similar manner, a given shift in phase of the 60 kilocycle signal would produce three times that phase shift in the 180 kilocycle reference frequency.

Fig. 8 is a drawing similar to Fig. 7 but representing phase relationships between a 60 kilocycle signal and an 80 kilocycle signal with the comparison being made at a reference frequency of 240 kilocycles.

It will be appreciated that in placing the apparatus in operation the frequency dividing and frequency multiplying equipment will not necessarily lock in at the points referred to in the previous description. In Fig. 5 for example, the frequency divider producing a 20 kc. wave may have locked in at either of the 60 kc. positive crests marked 6a or 6b. An analysis of the figure will show that in either of these conditions the derived 80 kc. curve will either lead or lag the 80 kc. wave from transmitter B by 120°.

With respect to Fig. 6, it may be similarly shown that the derived 90 kc. wave may be either in phase or in phase opposition to the 90 kc. signal from transmitter C. This ambiguity does not affect the operation of the system since the 80 kc. wave is multiplied up to 240 kc. while the 90 kc. wave is multiplied up to 180 kc., multiplying factors of 3 and 2 respectively. Since, as has been shown with reference to Figs. 7 and 8, the phase shift at the high frequency is equal to the phase shift at the lower frequency multiplied by the ratio of the higher frequency to the lower frequency, the 120° phase ambiguity mentioned with respect to Fig. 5 will be multiplied by 3, whereas the 180° phase ambiguity mentioned with respect to Fig. 6 will be multiplied by 2. The result of all of these multiplications is to produce an in-phase condition at the reference frequency of 240 kc. and 180 kc. respectively.

The apparatus which I prefer to employ for producing the equi-phase coordinate system hereinbefore described is illustrated diagrammatically in Fig. 3. As is shown therein, the transmitter A is operated as a master transmitter and may consist of an oscillator 20 of suitable character, the output of which is amplified by a power amplifier 21 and conveyed through a suitable coupling unit 22 (and transmission line, if desired) to a transmitting antenna 23 geographically located as represented at A in Fig. 1.

The transmitter C comprises a transmitting antenna 24 which is fed through a suitable coupling unit 25 from a power amplifier 26. The power amplifier 26, though operating at 90 kilocycles, is operated as a "slave" station, serving to rebroadcast signals received from the master transmitter A at the location of the C transmitter, these signals being picked up on a 60 kilocycle receiving loop 27, which is so located as to provide a null on antenna 24 and have maximum sensitivity in the direction of antenna 23 of the master transmitter A. The loop 27 is connected through a suitable coupling unit 28 to the input of an amplifier and frequency divider 29. The frequency divider is preferably constructed along the lines disclosed in my copending application Serial No. 612,990, filed August 27, 1945, and entitled Frequency Divider Circuits, and is adjusted to provide an output frequency one-half that of the input frequency; i. e. 30 kilocycles.

The 30 kilocycle output of the amplifier and divider 29 is fed to a phase controller 30, the construction and operation of which will be described hereinafter. The output of the phase controller 30 is coupled to a power amplifier 31 which is also operated at 30 kilocycles and which provides a sufficient output level to permit transmission of the output signals through a suitable transmission line 32 to the location of the transmitting antenna 24, at which location is situated the power amplifier 26. The power amplifier 26 also includes a frequency trebling circuit serving to raise the 30 kilocycle input frequency to the 90 kilocycle output which is radiated from the antenna 24 as the "C" signal.

The phase controller 30 operates as an automatic phase shifting device to maintain the proper phase relation between the transmissions from transmitters A and C. This is accomplished by comparing the determining the phase relation between these two transmissions and operating the phase shifting mechanism in opposition to any changes which may take place. For this reason the 60 kilocycle receiving loop (receiving 60 kilocycle signals transmitted from transmitter A) is coupled as by connection 33 to one terminal of a double-pole double-throw switch 34, one blade 35 of said switch being connected to the input of an amplifier and frequency trebler 36. While not so shown, a vacuum tube stage should be connected in the lead 33 to prevent phase shifts resulting from a change in circuit loading.

The frequency trebler 36 operates to convert the 60 kilocycle input derived from the receiving loop 27 to a 180 kilocycle output, which output is coupled to one set of input terminals of a phase discriminator 37. The phase discriminator 37 is preferably constructed along the lines described in my aforementioned copending application Serial No. 612,991. The other input signal to the phase discriminator 37 is derived from a small pick-up loop 38 which is mounted near transmitting antenna 24 and which is therefore excited at 90 kilocycles from transmitter C. The pick-up loop 38 is connected as by a transmission line 39 to another terminal of the double-pole double-throw switch 34, the second blade 40 of which is connected to the input of a phase shifter 41.

The output of the phase shifter 41 is connected to the input of an amplifier and frequency doubler 42 operation to raise the 90 kilocycle input frequency to a 180 kilocycle output frequency. The output from the amplifier and doubler 42 is connected to the second pair of input terminals of the phase discriminator 37. The phase discriminator 37 provides two outputs, one of which is connected to a phase indicator 43 serving to indicate continually the phase relationship between the A and C transmissions as referred to a 180 kilocycle reference frequency, and the other of which is coupled to the phase controller 30. The phase discriminator 37 operates to compare and measure the phase angle between the output signals of the amplifiers 36 and 42 and to produce a control potential which varies in magnitude in accordance with variations in the measured phase relationship. This control potential is applied to the phase controller 30 to produce a shift in the absolute phase of the 90 kilocycle transmissions from antenna 24 in such direction and of such magnitude as to exactly offset the change in conditions which resulted in the original phase shift detected by the phase discriminator 37. The phase discriminator 37 and phase controller 30 thus cooperate to maintain between the A and C transmissions a fixed phase relationship. This fixed relationship may be changed as required by operating conditions or other factors through a phase shift introduced by operation of the phase shifter 41.

The transmitter B is also a "slave" transmitter operating to receive signals from transmitter A and rebroadcast those signals at a frequency of 80 kilocycles. The mechanism used is identical in principle to that described in connection with transmitter C except that the frequency multipliers and frequency dividers are adjusted to convert the 60 kilocycle signal received into an 80 kilocycle transmitted frequency and to effect the phase comparison on the basis of a reference frequency of 240 kilocycles.

Figure 4:
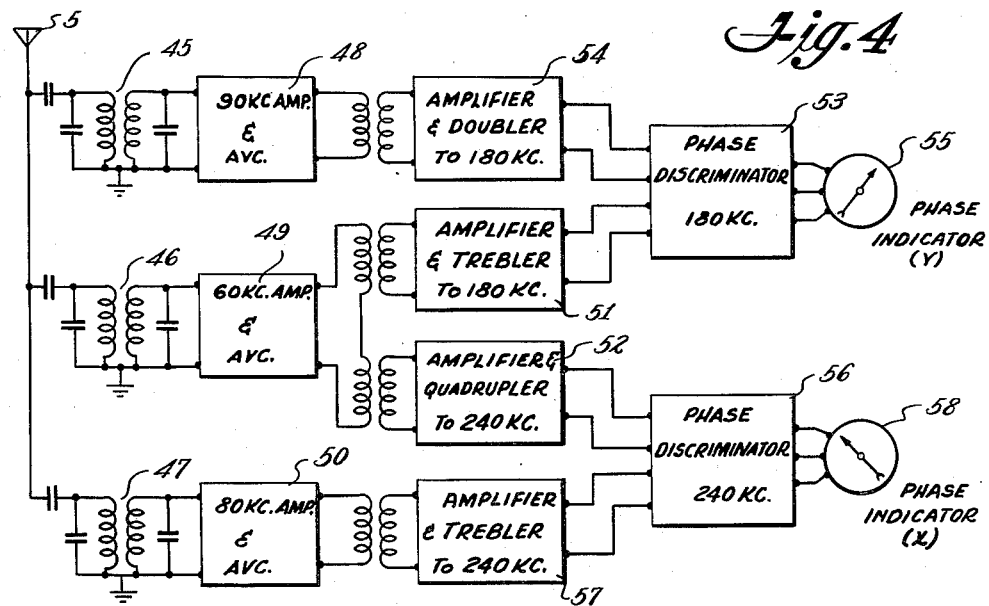
Fig. 4 is a diagrammatic representation of the receiving apparatus used in the system.

I have diagrammatically illustrated in Fig. 4 a receiving apparatus such as may be installed on the vessel 1. This apparatus and its operation is described in detail in my aforementioned copending application Serial No. 612,991. As is shown diagrammatically in Fig. 4, the receiving antenna 5 is coupled through frequency selecting couplers 45, 46, and 47 to radio frequency amplifiers 48, 49 and 50, respectively, these amplifiers being respectively tuned to 90, 60 and 80 kilocycles to produce across their output terminals output signals representing the transmissions from the C, A and B antennae, respectively.

The output of the 60 kilocycle amplifier 49 is divided between two amplifiers 51 and 52. The amplifier 51 includes a frequency trebling circuit serving to produce a 180 kilocycle output which is fed to one input circuit of a phase discriminator 53. The phase discriminator 53 may be identical to the phase discriminator 37 previously referred to. The 90 kilocycle output from the amplifier 48 is coupled to an amplifier and doubler 54 serving to also produce a 180 kilocycle output. This output is coupled to the outer input circuit of the phase discriminator 53. A phase indicator 55 is connected to the output of the phase discriminator 53 and serves to indicate the phase relationship existing between the A and C signals at the location of the antenna 5.

The amplifier 52 includes a frequency quadrupling circuit serving to produce a 240 kilocycle output which is connected to one input circuit of a second phase discriminator 56 which may also be identical to the phase discriminator 37 previously referred to. The 80 kilocycle output from the amplifier 50 is coupled to an amplifier and frequency trebler 57 serving to produce a 240 kilocycle output which is connected to the other input circuit of the phase discriminator 56. The phase discriminator 56 operates to compare and determine the phase relationship between the two 240 kilocycle signals applied to its two input circuits. The output of the discriminator 56 is coupled to a second phase indicator 58. The phase indicator 58 therefore serves to indicate the "X" coordinate of the geographical location of the vessel 1 while the phase indicator 55 serves to indicate the "Y" coordinate.

The phase indicators 55 and 58 and the phase indicator 43 previously referred to are preferably constructed along the lines as described in my copending application Serial No. 612,991, filed August 27, 1945, and entitled Multiple Channel Radio Frequency Receiver.

Figure 9:
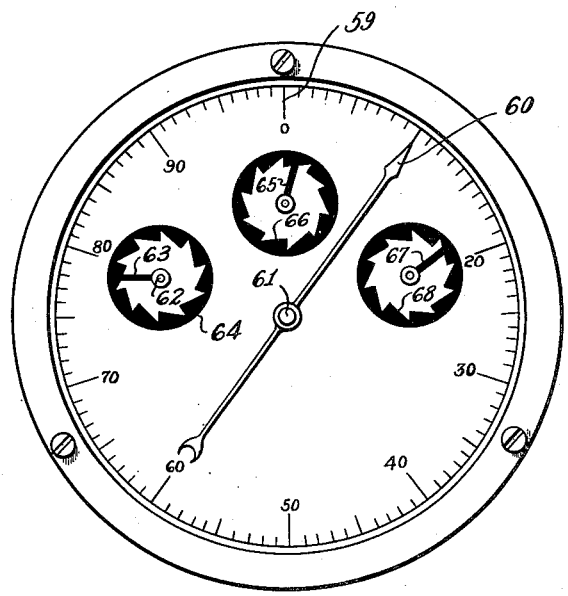
Fig. 9 is an elevational view illustrating the face appearance of a coordinate indicator used with the receiving apparatus.

I have illustrated in Fig. 9 the face or dial of the phase indicators as comprising a full circle scale 59 which is preferably divided into one hundred equal parts and arranged to be traversed by a full-sweep hand 60. The mechanism of the phase indicator is such that when the phase relationship undergoes a progressive change amounting to 360 electrical degrees, the hand 60 will make one full revolution over the scale 59. This motion is imparted to the pointer 60 by a shaft 61 which is in turn connected by gearing (not shown) to an auxiliary indicating shaft 62 arranged to produce one revolution of the shaft 62 for each ten revolutions of the shaft 61.

The shaft 62 carries a hand or pointer 63 arranged to move over an auxiliary scale 64 divided, by preference, into ten equal parts. Similarly, auxiliary indicating hands and associated scales 65—66 and 67—68 are interconnected with each other and with the shaft 62 so that the hand 65 makes one full revolution for each ten revolutions of the hand 63 and so that the hand 67 makes one full revolution for each ten full revolutions of the hand 65. The pointers 63, 65 and 67, together with their associated scales therefore serve as totalizers or registers to indicate the cumulative total of the phase changes indicated by the hand 60.

If the hands 63, 65 and 67 are preset to the coordinate value of the known location of the vessel 1 at the time the system is placed in operation, the indicator will operate to continuously indicate the coordinate location of the vessel through rotation of the hand 60, and shifts in the position of the hand 60 exceeding one turn are recorded and indicated by the registering and totalizing mechanism comprising the auxiliary hands.

The aforementioned phase controller 30 may comprise an apparatus such as that illustrated in Fig. 10. In Fig. 10 the circuits for supplying power to the cathode heaters of the various vacuum tubes employed are omitted, since such circuits are conventional and do not require illustration. Similarly, an arrow bearing the legend B+ has been used to indicate connection to a suitable source of plate or anode supply potential, it being understood that any suitable source may be used. Also, input and output frequency of 30 kilocycles have been indicated in Fig. 10 representing the phase controller 30 associated with the transmitter C. In parenthesis appears the notation "20 kilocycles" indicating the frequency involved when a similar apparatus is used as the phase controller for transmitter B.

The divider output (from the amplifier and frequency divider 29) is connected as by conductors 75 and 76 to an untuned primary winding 77 of an input transformer 78, a loosely coupled secondary 79 of which is tuned to the input frequency by tuning condensers 80 and 81, respectively. One terminal of the secondary 79 is connected as by means of conductors 82 and 83 to a source of plate supply potential through a plate ammeter 84 used to indicate the plate current flowing in the conductor 83. The other terminal of the secondary 79 is connected as by conductors 85 and 86 to the plate of a vacuum tube 87, which, by preference, comprises a tube of the pentode type.

The cathode and suppressor grid of the tube 87 are interconnected and connected to ground through a cathode bias resistance 88 which is by-passed by a suitable condenser 89. The screen grid of the tube 87 is by-passed to ground through a condenser 90 and derives operating potential from the conductor 83 which is fed to the screen grid by means of a conductor 91 and series resistance 92. The grid of the tube 87 is connected to the conductor 85 through a grid coupling condenser 93. Also a resistance 94 and inductance 95 are connected in series with each other between the grid of the tube 87 and a coupling resistance 96 as by means of a conductor 97; the other end of the coupling resistance 96 being connected as by means of a conductor 98 to the output of the phase discriminator.

The transformer 78 previously mentioned is provided also with a closely coupled secondary winding 99 which is tuned to the input frequency by a condenser 81. One terminal of the winding 99 is connected to the conductor 82 and the other terminal is connected to the plate of a vacuum tube 100. The cathode, suppressor grid and screen grid circuits of this tube are identical to those described in connection with the vacuum tube 87. Similarly, the grid of the tube 100 is coupled to the plate thereof through a coupling condenser 101 and is connected also through a resistance 102 and inductance 103 to the coupling resistance 96.

The condenser 101, resistance 102 and inductance 103 (and also the condenser 93, resistance 94 and inductance 95) are so adjusted as to apply to the grids of the respective vacuum tubes a voltage which bears a phase quadrature relationship to the voltage appearing on the plates of the respective tubes. When this condition obtains, the plate current drawn from the transformer secondaries 79 and 99 are in phase quadrature to the voltage developed across these windings so that the tubes 87 and 100 operate as reactance loads imposed across these transformer windings.

The magnitude of the equivalent reactance is determined by the mutual conductance of the tubes. This is regulated by adjusting the grid bias of the respective tubes. It will be noted that the grid returns for the tubes 87 and 100 are effected through the coupling resistance 96 and the phase discriminator 37. The phase discriminator 37 operates to produce a direct potential which is a sine function of the phase angle between the two radio frequency inputs to the phase discriminator 37. Therefore, a change in phase relationship between the radio frequency inputs to the phase discriminator results in a change in the grid bias applied to the vacuum tubes 87 and 100. This in turn results in a change of the magnitude of the plate current drawn by these tubes and a corresponding change in the effective reactance imposed by these tubes upon the circuit.

This change in circuit reactance serves to shift the phase of the signals which are applied to the grid of an amplifying tube 104 through a coupling condenser 105 from the transformer secondary 79. The input, cathode, screen grid and suppressor circuits of the tube 104 are conventional. The plate of the tube 104 is connected to a suitable source of plate supply potential through one fixed winding 106 of a manually adjustable phase shifter represented generally at 107. The winding 106 is preferably tuned to the input frequency as by a tuning condenser 108.

The plate of the tube 104 is coupled also through a coupling condenser 109 to a second fixed winding 110 of the phase shifter 107, the winding 110 being tuned to the input frequency by a tuning condenser 111 and having its other terminal connected to ground as by a conductor 112.

The phase shifter 107 includes a third winding 113 which is arranged to be moved with respect to the windings 106 and 110 so that the phase angle of the voltage induced in the winding 110 may be adjusted with respect to that developed across the winding 106. One terminal of the winding 113 is grounded and both terminals are connected as by conductors 114 and 115 to the input of the power amplifier 31.

In the operation of the device, the plate ammeter 84 serves to indicate the plate current drawn by the tubes 87 and 100. Should the phase relationship between the transmissions tend to shift in a progressive manner, the bias imposed upon the tubes 87 and 100 will shift in a like manner to maintain fixed the phase relation despite the tendency of that relation to shift. Whenever the plate current drawn by the tubes 87 and 100 reduces to an undesirably low value or increases to an undesirably high value as shown by the plate ammeter 84, manual adjustment of the phase shifter 107 may be used to relieve or increase, as is desired, the load imposed upon the tubes 87 and 100. In normal operation, the direct control potential delivered by the discriminator need not vary more than approximately plus or minus one volt, as the control action of the reactor tubes is sufficiently sensitive to give adequate regulation with a small shift in grid bias.

Provision is made for checking the operation of the slave transmitting equipment at any time. This is accomplished by throwing the double-pole double-throw switch 34 to the position which is alternate to that shown in Fig. 3. When the switch is so thrown, the input to the amplifier and trebler 36 and the input to the phase shifter 41 are both connected to the output of a "pip" generator 116.

The "pip" generator 116, which is preferably constructed in accordance with the disclosures contained in my copending application Serial No. 612,988, filed August 27, 1945, now Patent No. 2,524,677 issued October 3, 1950, and entitled Signal Generator, delivers an output signal consisting of a series of signal impulses or "pips" at a frequency of say 10 kilocycles and each having a duration of a few micro-seconds. The feature of this type of output signal is that it includes not only the 10 kilocycle fundamental, but an infinite series of both odd and even harmonics thereof. Furthermore, the multiple phase relationship between any two harmonics is the same as that existing between any other two harmonics. Thus, when the switch 34 is thrown to connect the "pip" generator 116 into the system, the 60 kilocycle harmonic is amplified and trebled by the amplifier 36, whereas the 90 kilocycle harmonic is fed through the phase shifter 41 and amplified by the amplifier and trebler 42. Since the multiple phase relationship between these two harmonics is fixed, the phase indicator 43 will provide a given indication which will not change unless some faulty operation of maladjustment develops in the amplifier and frequency multipliers associated with the phase discriminator circuit.

A duplicate slave control unit is preferably provided for each of the slave transmitters B and C. This duplication serves a dual purpose in that it provides a spare unit properly adjusted to switch into operation in the event of a failure of the operating unit, and it also serves as a phase monitor for the operating unit and may be tested by manipulation of the switch 34 as above described at any time without interference with the normal automatic phase control of the operating unit.

When the system is first placed in operation, a receiving unit such as that employed on the vessel 1 is placed at a known geographical location and the phase shifter 41 for transmitter C and the similar phase shifter for transmitter B are adjusted to produce at the field receiving apparatus the desired coordinate indication. The "pip" generators 116 at transmitters B and C are then switched into operation and the readings given by the associated phase indicators 43 are noted. This then becomes the standard reference reading and whenever, during the normal operation of the device, the "pip" generators are cut into the circuit and the same readings are indicated on the phase indicators 43 one is assured that the equipment is operating in the intended manner.

The apparatus required for operating a system of four transmitters, such as that illustrated in Fig. 2, is similar to that which has been described in connection with Fig. 1, there being required, however, the additional slave transmitter apparatus required to excite the antenna D and a fourth receiving channel for receiving the transmission from the transmitter D. The phase relationships established and the manner of making the phase comparison are, in this latter modification of my invention, identical with that which have been previously described.

From the foregoing, it will be observed that I have provided a novel navigation system employing simultaneous radio frequency transmissions from spaced points and at different but related frequencies for establishing a coordinate system which may be represented by lines of equal phase displacement. The location of a vessel within this coordinate system is continuously indicated through the use of receiving apparatus operating to receive the simultaneous transmission and to effect a phase comparison between selected pairs of received signals, the results of the phase comparison being indicated by an indicating instrument arranged to translate the phase angle relationships into a visual indication of the coordinate location of the vessel in terms of the previously mentioned coordinate system.

Attention is directed particularly to the fact that the apparatus is arranged to be automatic in its operation as regards the maintaining of the proper phase relationship among the various transmissions so that the geographical location indicated by the receiving apparatus is not only precise but trustworthy and dependable.

Attention is also directed to the use of the phase discriminator in conjunction with the phase controller for regulating the phase of the signals transmitted from the sleeve transmitters with respect to those radiated from the master transmitter. It will be noted that I have provided a means for continually indicating the regulated phase relationship and a standard of reference which permits any malfunctioning of the apparatus to be detected at once.

While I have shown and described the preferred embodiment of my invention, I do not desire to be limited to any of the details of construction shown or described herein, except as defined in the appended claims.

I claim:

1. A radio frequency navigation system comprising a master radio frequency transmitter at one location for radiating radio frequency energy of a given frequency; a first receiving means at a second location for receiving said radiations; frequency change means coupled to said receiving means; an amplifying and transmitting means coupled to said frequency change means for radiating radio frequency energy at a second frequency different from said given frequency; a second receiving means at a third location for receiving radiations at said given frequency; another frequency change means coupled to said second receiving means; another amplifying and transmitting means coupled to said other frequency change means for radiating radio frequency energy at a third frequency different from said second frequency and said given frequency; and continuously operating phase controlling means for maintaining fixed multiple phase relationships among said radiations.

2. The method of maintaining a fixed multiple phase relation between two radio frequency transmissions at different but related frequencies which consists in radiating radio frequency energy at one frequency; receiving said radiation, changing the frequency of said received radiation to a different frequency, re-radiating said different frequencies; receiving said re-radiated different frequencies; measuring the multiple phase relation between said received radiations; and shifting the phase of said re-radiations in opposition to changes in said measured relation.

3. A radio frequency navigation system comprising a master radio frequency transmitter at one location for radiating radio frequency energy at a given frequency; and a pair of slave radio frequency transmitters at two other locations each spaced from said one location and each including means for receiving radiations at said given frequency, means for changing the frequency of said received radiations to a different frequency, radiating means for radiating radio frequency energy at said different frequencies, a phase discriminator for measuring the multiple phase relation between said received radiations and radiations at said different frequencies, and phase control means in circuit with said radiating means and coupled to said phase discriminator for shifting the phase of said different frequency radiations in opposition to phase changes measured by said phase discriminator.

4. In a radio frequency transmission apparatus for producing simultaneous radio frequency transmission from spaced points at unlike but related frequencies, the combination of: a radio frequency transmitter at one location for radiating radio frequency energy of a given frequency; a radio frequency receiver at another location spaced from said one location and tuned to said given frequency to receive the transmissions from said one location; a frequency converter coupled to the output of said receiver for producing an output of another frequency different from but related to said given frequency; a power amplifier coupled to the output of said frequency converter; a radiator coupled to the output of said power amplifier; and a phase controller for holding a fixed multiple phase relation between the signals received by said receiver and the signals emanated from said radiator.

5. In a radio frequency transmission apparatus for producing simultaneous radio frequency transmissions from spaced points at unlike but related frequencies, the combination of: a radio frequency transmitter at one location for radiating radio frequency energy of a given frequency; a radio frequency receiver at another location spaced from said one location and tuned to said given frequency to receive the transmissions from said one location; a frequency converter coupled to the output of said receiver for producing an output of another frequency different from but related to said given frequency; a power amplifier coupled to the output of said frequency converter; a radiator coupled to the output of said power amplifier; a pick-up unit near said radiator; a frequency changer coupled to said pick-up unit for producing a reference frequency equal to the least common multiple of said given frequency and said other frequency; another frequency changer coupled to said receiver for producing an output having said reference frequency; a phase discriminator coupled between said frequency changers for producing an output potential representative of the phase relation between said frequency changer outputs; and a phase controller coupled between said power amplifier and said phase discriminator for changing the reactance of said amplifier in response to changes in said output potential and in a direction opposing said change.

6. In a radio frequency transmission apparatus for producing simultaneous radio frequency transmissions from spaced points at unlike but related frequencies, the combination of: a radio frequency transmitter at one location for radiating radio frequency energy of a given frequency; a radio frequency receiver at another location spaced from said one location and tuned to said given frequency to receive the transmissions from said one location; a frequency converter coupled to the output of said receiver for producing an output of another frequency different from but related to said given frequency; a power amplifier coupled to the output of said frequency converter; a radiator coupled to the output of said power amplifier; a pick-up unit near said radiator; a frequency changer coupled to said pick-up unit for producing a reference frequency equal to the least common multiple of said given frequency and said other frequency; another frequency changer coupled to said receiver for producing an output having said reference frequency; a phase discriminator coupled between said frequency changers for producing an output potential representative of the phase relation between said frequency changer outputs; a phase controller coupled between said power amplifier and said phase discriminator for changing the reactance of said amplifier in response to changes in said output potential and in a direction opposing said change; and a phase angle indicator coupled to receive said output potential for visually indicating said phase relation.

7. In a radio frequency transmission apparatus for producing simultaneous radio frequency transmissions from spaced points at unlike but related frequencies, the combination of: a radio frequency transmitter at one location for radiating radio frequency energy of a given frequency; a radio frequency receiver at another location spaced from said one location and tuned to said given frequency to receive the transmissions from said one location; a frequency converter coupled to the output of said receiver for producing an output of another frequency different from but related to said given frequency; a power amplifier coupled to the output of said frequency converter; a radiator coupled to the output of said power amplifier; a pick-up unit near said radiator; a frequency changer coupled to said pick-up unit for producing a reference frequency equal to the least common multiple of said given frequency and said other frequency; another frequency changer coupled to said receiver for producing an output having said reference frequency; a phase discriminator coupled between said frequency changers for producing an output potential representative of the phase relation between said frequency changer outputs; a phase controller connected between said power amplifier and said phase discriminator for changing the reactance of said amplifier in response to changes in said output potential and in a direction opposing said change; a phase angle indicator coupled to receive said output potential for visually indicating said phase relation; a source of two radio frequency signals having said given and said other frequencies and having a fixed phase relation; and means for connecting said source to the inputs of said frequency changers.

8. In a radio frequency transmission apparatus for producing simultaneous radio frequency transmissions from spaced points at unlike but related frequencies, the combination of: a radio frequency transmitter at one location for radiating radio frequency energy of a given frequency; a radio frequency receiver at another location spaced from said one location and tuned to said given frequency to receive the transmissions from said one location; a frequency converter coupled to the output of said receiver for producing an output of another frequency different from but related to said given frequency; a power amplifier coupled to the output of said frequency converter; a radiator coupled to the output of said power amplifier; a pick-up unit near said radiator; a frequency changer coupled to said pick-up unit for producing a reference frequency equal to the least common multiple of said given frequency and said other frequency; another frequency changer coupled to said receiver for producing an output having said reference frequency; a phase discriminator coupled between said frequency changers for producing an output potential representative of the phase relation between said frequency changer outputs; a phase controller coupled between said power amplifier and said phase discriminator for changing the reactance of said amplifier in response to changes in said output potential and in a direction opposing said change; and phase change means connected in circuit with one of said frequency changers.

9. In a radio frequency transmission apparatus for producing simultaneous radio frequency transmissions from spaced points at unlike but related frequencies, the combination of: a radio frequency transmitter at one location for radiating radio frequency energy of a given frequency; a radio frequency receiver at another location spaced from said one location and tuned to said given frequency to receive the transmissions from said one location; a frequency converter coupled to the output of said receiver for producing an output of another frequency different from but related to said given frequency; a power amplifier coupled to the output of said frequency converter; a radiator coupled to the output of said power amplifier; a pick-up unit near said radiator; a frequency changer coupled to said pick-up unit for producing a reference frequency equal to the least common multiple of said given frequency and said other frequency; another frequency changer coupled to said receiver for producing an output having said reference frequency; a phase discriminator coupled between said frequency changers for producing an output potential representative of the phase relation between said frequency changer outputs; a phase controller coupled between said power amplifier and said phase discriminator for changing the reactance of said amplifier in response to changes in said output potential and in a direction opposing said change; and a manually adjustable phase change means in circuit with said phase controller, whereby the load on said phase controller may be manually adjusted.

10. In a radio frequency transmission apparatus for producing simultaneous radio frequency transmission from spaced points at unlike but related frequencies, the combination of: a radio frequency transmitter at one location for radiating radio frequency energy of a given frequency; a frequency converter at another location spaced from said one location for producing in response to excitation at said given frequency an output of another frequency different from but related to said given frequency; means for exciting said frequency converter with radio frequency energy of said given frequency from said one location; a power amplifier coupled to the output of said frequency converter; a radiator coupled to the output of said power amplifier; and a phase controller for holding a fixed multiple phase relation between the signals emanated from said radiator and the signals radiated from said one location.

11. In a radio frequency transmission apparatus for producing simultaneous radio frequency transmission from spaced points at unlike but related frequencies, the combination of: a radio frequency transmitter at one location for radiating radio frequency energy of a given frequency; a frequency converter at another location spaced from said one location for producing in response to excitation at said given frequency an output of another frequency different from but related to said given frequency; means for exciting said frequency converter with radio frequency energy of said given frequency from said one location; a power amplifier coupled to the output of said frequency converter; a radiator coupled to the output of said power amplifier; a pick-up unit near said radiator; a frequency changer coupled to said pick-up unit for producing a reference frequency equal to the least common multiple of said given frequency and said other frequency; another frequency changer for producing in response to excitation at said given frequency an output having said reference frequency; means for exciting said other frequency changer with radio frequency energy of said given frequency from said one location; a phase discriminator coupled between said frequency changers for producing an output potential representative of the phase relation between said frequency changer outputs; and a phase controller coupled between said power amplifier and said phase discriminator for changing the reactance of said amplifier in response to changes in said output potential and in a direction opposing said change.

12. In a radio frequency transmission apparatus for producing simultaneous radio frequency transmission from spaced points at unlike but related frequencies, the combination of: a radio frequency transmitter at one location for radiating radio frequency energy of a given frequency; a frequency converter at another location spaced from said one location for producing in response to excitation at said given frequency an output of another frequency different from but related to said given frequency; means for exciting said frequency converter with radio frequency energy of said given frequency from said one location; a power amplifier coupled to the output of said frequency converter; a radiator coupled to the output of said power amplifier; a pick-up unit near said radiator; a frequency changer coupled to said pick-up unit for producing a reference frequency equal to the least common multiple of said given frequency and said other frequency; another frequency changer for producing in response to excitation at said given frequency an output having said reference frequency; means for exciting said other frequency changer with radio frequency energy of said given frequency from said one location; a phase discriminator coupled between said frequency changers for producing an output potential representative of the phase relation between said frequency changer outputs; and a phase controller coupled between said power amplifier and said phase discriminator for changing the reactance of said amplifier in response to changes in said output potential and in a direction opposing said change; a phase angle indicator coupled to receive said output potential for visually indicating said phase relation; a source of two radio frequency signals having said given and said other frequencies and having a fixed phase relation; and means for connecting said source to the inputs of said frequency changers.

13. In a radio frequency transmission apparatus for producing simultaneous radio frequency transmission from spaced points at unlike but related frequencies, the combination of: a radio frequency transmitter at one location for radiating radio frequency energy of a given frequency; a frequency converter at another location spaced from said one location for producing in response to excitation at said given frequency an output of another frequency different from but related to said given frequency; means for exciting said frequency converter with radio frequency energy of said given frequency from said one location; a power amplifier coupled to the output of said frequency converter; a radiator coupled to the output of said power amplifier; a pick-up unit near said radiator; a frequency changer coupled to said pick-up unit for producing a reference frequency equal to the least common multiple of said given frequency and said other frequency; another frequency changer for producing in response to excitation at said given frequency an output having said reference frequency; means for exciting said other frequency changer with radio frequency energy of said given frequency from said one location; a phase discriminator coupled between said frequency changers for producing an output potential representative of the phase relation between said frequency changer outputs; and a phase controller coupled between said power amplifier and said phase discriminator for changing the reactance of said amplifier in response to changes in said output potential and in a direction opposing said change; and a manually adjustable phase change means in circuit with said phase controller, whereby the load on said phase controller may be manually adjusted.

14. In a radio frequency transmission apparatus for producing simultaneous radio frequency transmissions from spaced points at unlike but related frequencies, the combination of: a radio frequency transmitter at one location for radiating radio frequency energy of a given frequency; a radio frequency receiver at another location spaced from said one location and tuned to said given frequency to receive the transmissions from said one location; a frequency converter coupled to the output of said receiver for producing an output of another frequency different from but related to said given frequency; a radiator coupled to the output of said frequency converter; and a phase controller for holding a fixed multiple phase relation between the signals received by said receiver and the signals emanated from said radiator.

15. In a radio frequency transmission apparatus for producing simultaneous radio frequency transmissions from spaced points at unlike but related frequencies, the combination of: a radio frequency transmitter at one location for radiating radio frequency energy of a given frequency; a frequency converter at another location spaced from said one location for producing in response to excitation at said given frequency an output of another frequency different from but related to said given frequency; means for exciting said frequency converter with radio frequency energy of said given frequency from said one location; a radiator coupled to the output of said frequency converter; and a phase controller for holding a fixed multiple phase relation between the signals emanated from said radiator and the signals radiated from said one location.

16. In a radio frequency transmission apparatus for producing simultaneous radio frequency transmission from spaced points at unlike but related frequencies, the combination of: a radio frequency transmitter at one location; another radio frequency transmitter at another location spaced from said one location; and a continuously operating phase controller connected to control one of said transmitters and responsive to signals from both of said transmitters for maintaining a fixed phase relation between the signals radiated by said transmitters.

17. In a radio frequency transmission apparatus for producing simultaneous radio frequency transmission from spaced points at unlike but related frequencies, the combination of: a radio frequency transmitter at one location; another radio frequency transmitter at another location spaced from said one location; a phase discriminator at one of said locations having two inputs and means for producing a control potential representative of the phase relation between two signals applied to said two inputs; means for applying to said two inputs signals from said transmitters; and a continuously operating phase controller coupled to said phase discriminator and connected to control one of said transmitters in response to variations in said control potential for maintaining a fixed phase relation between the signals radiated by said transmitters.

18. In a radio frequency transmission apparatus for producing simultaneous radio frequency transmissions from spaced points at unlike frequencies that are harmonics of a given frequency, the combination of: a radio frequency transmitter at one location for radiating radio frequency energy of a first selected harmonic of said given frequency; a radio frequency receiver at another location spaced from said one location and tuned to said first selected harmonic to receive the transmissions from said one location; a frequency converter coupled to the output of said receiver for producing an output of another harmonic different from said first selected harmonic; a power amplifier coupled to the output of said frequency converter; a radiator coupled to the output of said power amplifier; a pick-up unit near said radiator; another frequency converter coupled to the output of said pick-up unit for producing a first phase comparison signal; a third frequency converter coupled to said receiver for utilizing the signal input to said receiver and for producing a second phase comparison signal equal in frequency to that of said first phase comparison signal; a phase discriminator coupled to both of said other and third frequency converters for measuring the phase relation between said phase comparison signals and producing an output potential representative of the multiple phase relation between the signal received from said one location and the signal output of said pick-up unit; and a phase controller connected between said power amplifier and said phase discriminator for changing the phase shift through said amplifier in response to changes in said output potential and in a direction opposing said changes.

19. In a radio frequency transmission apparatus for producing simultaneous radio frequency transmissions from spaced points at unlike frequencies that are harmonics of a given frequency, the combination of: a radio frequency transmitter at one location for radiating radio frequency energy of a first selected harmonic of said given frequency; a radio frequency receiver at another location spaced from said one location and tuned to said first selected harmonic to receive the transmissions from said one location; a frequency converter coupled to the output of said receiver for producing an output of another harmonic different from said first selected harmonic; a power amplifier coupled to the output of said frequency converter; a radiator coupled to the output of said power amplifier; a pick-up unit near said radiator; another frequency converter coupled to the output of said pick-up unit for producing a first phase comparison signal; a third frequency converter coupled to said receiver for utilizing the signal input to said receiver and for producing a second phase comparison signal equal in frequency to that of said first phase comparison signal; a phase discriminator coupled to both of said other and third frequency converters for measuring the phase relation between said phase comparison signals and producing an output potential representative of the multiple phase relation between the signal received from said one location and the signal output of said pick-up unit; a phase controller connected between said power amplifier and said phase discriminator for changing the phase shift through said amplifier in response to changes in said output potential and in a direction opposing said changes; a source of radio frequency energy for producing an output containing harmonics equal in frequency to said first selected harmonic and said other harmonic; and means for connecting the output of said source to the inputs of said other and third frequency converters.

20. In a radio frequency transmission apparatus for producing a fixed radio frequency pattern in space, the combination of: a source of radio frequency signals; a radiator; a power amplifier having its input coupled to said source and its output coupled to said radiator; a receiver situated at a location distant from said radiator for receiving signals controlled by said source and for producing an amplified signal; a second radiator at said distant location; means for applying said amplified signal to said second radiator; a second amplifier coupled to said receiver to produce from said radio frequency signals a first phase comparison signal; a third amplifier coupled to said second radiator for producing a second phase comparison signal having a frequency equal to that of said first phase comparison signal; a phase discriminator coupled to said second and third amplifiers for measuring the phase relation of said phase comparison signals and providing a direct control potential, the polarity and magnitude of which is indicative of the deviation of the phase relation of said first and second phase comparison signals from a given phase relation; a pattern phase shifter in circuit with one of said amplifiers for adjusting the orientation of the radio frequency pattern in space; and a potential sensitive phase shifter in circuit with said receiver and coupled to said discriminator for actuation by said control potential to provide phase corrections to maintain said radio frequency pattern in a substantially fixed position in space.

21. In a radio frequency transmission apparatus for producing a fixed radio frequency pattern in space, the combination of: a source of radio frequency signals; a radiator; a power amplifier having its input coupled to said source and its output coupled to said radiator; a receiver situated at a location distant from said radiator for receiving signals controlled by said source and for producing an amplified signal; a second radiator at said distant location; means for applying said amplified signal to said second radiator; a second amplifier coupled to said receiver to produce from said radio frequency signals a first phase comparison signal; a third amplifier coupled to said second amplifier for producing a second phase comparison signal having a frequency equal to that of said first phase comparison signal; a phase discriminator coupled to said second and third amplifiers for measuring the phase relation of said phase comparison signals and producing a direct control potential, the polarity and magnitude of which is indicative of the deviation of the phase relation of said first and second phase comparison signals from a given phase relation; a pattern phase shifter in circuit with one of said amplifiers for adjusting the orientation of said radio frequency pattern in space; a potential sensitive phase shifter in circuit with said receivers and coupled to said discriminator for actuation by said control potential to provide phase corrections required to maintain said radio frequency pattern in a substantially fixed position in space; and a reference means to provide a phase standard for guiding the adjustment of said pattern phase shifter.

22. In a radio frequency transmission apparatus for producing a fixed radio frequency pattern in space, the combination of: a source of radio frequency signals; a radiator; a power amplifier having its input coupled to said source and its output coupled to said radiator; a receiver situated at a location distant from said radiator for receiving signals controlled by said source and for producing an amplified signal; a second radiator at said distant location; means for applying said amplified signal to said second radiator; means cooperating with said receiver for preventing feed-back from the output of said second radiator to the input of said receiver; a second amplifier coupled to said receiver to produce from said radio frequency signals a first phase comparison signal; a third amplifier coupled to said second radiator for producing a second phase comparison signal having a frequency equal to that of said first phase comparison signal; a phase discriminator coupled to said second and third amplifiers for measuring the phase relation of said phase comparison signal and producing a direct control potential, the polarity and magnitude of which is indicative of the deviation of the phase relation of said first and second phase comparison signals from a given phase relation; a pattern phase shifter in circuit with one of said amplifiers for adjusting the orientation of said radio frequency pattern in space; and a potential sensitive phase shifter in circuit with said receiver and coupled to said discriminator for actuation by said control potential to provide phase corrections required to maintain said radio frequency pattern in a substantially fixed position in space.

23. In a radio frequency transmission apparatus for producing a fixed radio frequency pattern in space, the combination of: a source of radio frequency signals; a radiator; a power amplifier having its input coupled to said source and its output coupled to said radiator; a receiver situated at a location distant from said radiator for receiving signals controlled by said source and for producing an amplified signal; a second radiator at said distant location; means for applying said amplified signal to said second radiator; means cooperating with said receiver for preventing feed-back from the output of said second radiator to the input of said receiver; a second amplifier coupled to said receiver to produce from said radio frequency signals a first phase comparison signal; a third amplifier coupled to said second radiator for producing a second phase comparison signal having a frequency equal to that of said first phase comparison signal; a phase discriminator coupled to said second and third amplifiers for measuring the phase relation of said phase comparison signals and producing a direct control potential, the polarity and magnitude of which is indicative of the deviation of the phase relation of said first and second phase comparison signals from a given phase relation; a pattern phase shifter in circuit with one of said amplifiers for adjusting the orientation of said radio frequency pattern in space; a potential sensitive phase shifter in circuit with said receiver and coupled to said discriminator for actuation by said control potential to provide phase corrections required to maintain said radio frequency pattern in a substantially fixed position in space; and a reference means to provide a phase standard for guiding the adjustment of said pattern phase shifter.

WILLIAM J. O'BRIEN.

No references cited.